(12) United States Patent
Seynhaeve et al.

(10) Patent No.: US 7,846,539 B2
(45) Date of Patent: Dec. 7, 2010

(54) ROLL OF PREFORMED STEEL CORD REINFORCED STRIP

(75) Inventors: Geert-Filiep Seynhaeve, Wevelgem (BE); Renaat Vandemeulebroecke, Zwevegem (BE)

(73) Assignee: NV Bekaert SA, Zwevegem (BE)

( * ) Notice: Subject to any disclaimer, the term of this patent is extended or adjusted under 35 U.S.C. 154(b) by 379 days.

(21) Appl. No.: 11/995,948

(22) PCT Filed: Jul. 4, 2006

(86) PCT No.: PCT/EP2006/063854

§ 371 (c)(1),
(2), (4) Date: Feb. 7, 2008

(87) PCT Pub. No.: WO2007/009873

PCT Pub. Date: Jan. 25, 2007

(65) Prior Publication Data

US 2010/0119806 A1 May 13, 2010

(30) Foreign Application Priority Data

Jul. 20, 2005 (EP) .................................. 05106622

(51) Int. Cl.
*B32B 25/02* (2006.01)
(52) U.S. Cl. ................... 428/295.1; 428/298.1; 492/56; 57/200
(58) Field of Classification Search ............... 428/295.1, 428/379, 36.2, 298.1, 35.1; 57/200; 492/56
See application file for complete search history.

(56) References Cited

U.S. PATENT DOCUMENTS

| 3,301,932 | A | | 1/1967 | Chisholm |
| 4,957,592 | A | * | 9/1990 | O'Neill ......................... 216/2 |
| H1333 | H | * | 7/1994 | Helfer et al. ................. 428/379 |
| 5,573,852 | A | | 11/1996 | Thal |
| 5,677,046 | A | * | 10/1997 | Fawley et al. ............. 428/295.4 |
| 2002/0193023 | A1 | * | 12/2002 | Adriaensen et al. ........... 442/52 |
| 2007/0089394 | A1 | * | 4/2007 | Vancompernolle et al. .... 57/200 |
| 2010/0119806 | A1 | * | 5/2010 | Seynhaeve et al. ........ 428/298.1 |

FOREIGN PATENT DOCUMENTS

| BE | 501611 A | 3/1951 |
| EP | 0 102 933 A1 | 3/1984 |
| FR | 1 239 298 A | 8/1960 |
| GB | 1 362 513 | 8/1974 |
| WO | WO 00/37738 A1 | 6/2000 |
| WO | WO 02/090812 A1 | 11/2002 |

* cited by examiner

*Primary Examiner*—N. Edwards
(74) *Attorney, Agent, or Firm*—Foley & Lardner LLP

(57) ABSTRACT

The invention concerns a roll of strip of elastomer material reinforced with parallel steel cords. The roll of strip differs from the prior art that it is intentionally not flat when unrolled: it has obtained a permanent preformation so as to take a helical shape when unwound. Such a strip is particularly useful for reinforcing substantially cylindrical objects such as tubes or pillars. Methods to produce such kind of strips are also presented.

13 Claims, 3 Drawing Sheets

ROLL OF PREFORMED STEEL CORD REINFORCED STRIP

FIELD OF THE INVENTION

The invention relates to a roll of strip comprising an elastomer that is reinforced with steel cords arranged parallel into said strip.

BACKGROUND OF THE INVENTION

Rolls of strips of elastomers are known and widely used for a variety of applications. The current invention relates to a roll of elastomer strip that is reinforced with steel cords. Such a composite combines the best of two worlds: the favourable properties of toughness, impermeability, ease of processing, relative chemical inertness of the elastomer with the strength, flexibility, high-temperature resistance of steel cord. The favourable properties are further enhanced when both components adhere very well to one another. Elastomer strips reinforced with steel cord are used already many years in the form of steel cord reinforced conveyor belts, or as power transmission belts, or as intermediate products in the production of tires. More recently, such steel cord reinforced elastomer strips are gaining importance as elevator hoisting elements (WO 00/37738). In all these dynamic applications the flexibility of the steel cord is important. Therefore steel cords assembled out of many individual fine filaments are used because with these filaments, the stiffness of the wires decreases considerably (the stiffness moment of a filament is proportional to the $4^{th}$ power of its diameter) and the flexibility of the cord increases provided that the filaments glide over one another.

There are however a number of quasi-static applications, where the flexibility of the steel cord is only needed for processing reasons: after the strip has been put into place, the steel cord is only statically or quasi-statically loaded and the flexibility property of the steel cord is not longer of use. The reinforcement of flexible pipes (WO 02/090812) and the repair of concrete pillars by retrofitting them with strip are non-exhaustive examples of such applications. In these applications, a roll of steel cord reinforced elastomer strip is wrapped around the object to be reinforced, being the inner pipe in case of a flexible pipe or the pillar in case of concrete repair. While the flexibility of the steel cord is needed in order to apply the strip to these objects, it is not longer needed once the strip is in place. However, introducing such flexibility into a steel cord makes the steel cord expensive: wires have to be drawn to a finer diameter and more wires have to be assembled together. A lot of effort and money is therefore put into a steel cord property that is only used once.

On the other hand, when stiffer steel cords are used in order to lower the cost, the bending around the article to be reinforced introduces residual stresses in the strip and makes the application of the strip onto the object to be reinforced much more difficult. This leads to a stress imbalance in the reinforcing layer. Also these residual stresses can be dangerous because the strip can spring back when the end is loosened. In addition the larger stiffness makes the attachment of the start or end of the strip more difficult. The increased stiffness of the strip also increases the forces on the object that is wrapped by the strip. In the case of repair of concrete pillars, this is not too much of a problem, but in the case of flexible pipes, the inner pipe must be made strong enough in order not to collapse under the force exerted by the strip during winding. I.e. the stiffness of the strip would inhibit the use of thin walled inner pipes.

SUMMARY OF THE INVENTION

It is therefore a first object of the invention to provide a roll of strip that eliminates the problems cited above and allows for the use of stiffer steel cords. It is a further object of the invention to provide a roll of strip that is better fit for its purpose than the prior-art strip. More in particular, a roll of strip is provided that has been preformed in function of the object to be reinforced.

According a first aspect of the invention (claim 1) a roll of strip is claimed. With a 'roll of strip' is meant a substantial length of a thin material with a certain width W—the strip—that is bent in one direction perpendicular to its length and width direction and so winds back on itself thus forming an annular body having a width substantially equal to the width W of the strip and having an inner and outer radius. The strip can be wound on a core tube, or a spool, or it can be wound on a collapsible core that is removed after winding.

The strip is provided comprising steel cords that are arranged parallel to one another and parallel to the surface of the strip. 'Parallel' in this configuration means that the distance between the steel cords amongst one another and the distance between the individual steel cords to the surface remain constant throughout the length of the strip. So when making a cross section at an arbitrary place in the strip, this cross section will be practically identical to the cross section at any other place, with the individual steel cords occurring at the same places.

The elastomer used for encapsulation of the steel cords can be a thermosetting or a thermoplastic polymer. Examples of the former are of course rubber in all its known forms such as natural or synthetic isoprene rubbers, styrene butadiene rubber (SBR), terpolymers of ethylene (EPDM) or any other rubber fit for the purpose. Examples of the latter are high-density poly ethylene (HDPE), polypropylene (PP), polyvinylchloride (PVC) or any other thermoplastic polymer. In the selection of the polymer, the environment the strip must endure as well as the type of material to be reinforced will be crucial. For example for very corrosive materials one will be forced to use poly tetrafluorethylene (PTFE) or some other fluoropolymer. In case the strip is used in a high temperature application, one could consider using poly phenylene sulphide (PPS).

The selection of the steel cord type to be used in the inventive roll of strip is determined by the required width-wise strength of the strip, which on its turn is determined by the application. In general this strength ST (expressed in N/mm) is calculated:

$$ST = (N/W) \times F_b = (F_b/d_{cord}) \times \phi_{strip}$$

wherein N is the number of cords in the strip, $F_b$ is the breaking load of the cord in 'Newton' and W is the width of the strip, taken perpendicular to its length and expressed in 'mm'. When all steel cords are situated in one layer the maximum (N/W) that can be achieved is when all cords are adjacent to one another. (N/W) is then equal to $1/d_{cord}$ where $d_{cord}$ is the diameter of the cord used. In general the cords will be spaced slightly apart from one another leading to a 'strip filling degree $\phi_{strip}$' that is equal to the sum of all diameters of the cord in the strip divided by the width of the strip. As one aims to reduce the number of strip layers in an application for cost reasons, it will be clear that both $(F_b/d_{cord})$ and $\phi_{strip}$ need to be as high as possible.

Regarding the first factor $(F_b/d_{cord})$ one will seek steel cords that:
have a high metallic density i.e. in a cross section of the cord, the ratio of metallic area to the area of the circumscribing circle should be as high as possible. So for a steel cord consisting of a single round wire (m=1), this metallic density is 100%, for m equals 2 this drops immediately to 50% for a steel cord made of two individual round filaments twisted around each other. For m values of 3 and 7 this becomes 65% and 78% respectively. For larger values of m this ratio approaches the maximum theoretical value of 90.7%.

are composed of filaments with a high tensile strength. The tensile strength is the ratio of the breaking load of the filament to its metallic, cross-sectional area. In practice, filaments with high tensile strength, say higher than 3700 N/mm$^2$, can only be produced with a round cross section and in diameters of say below 0.75 mm.

While in the prior art type of strips, the stiffness of the cord also plays an important role in the design, this is not longer the case for the inventive roll of strip. The stiffness of a cord is proportional to the sum of the stiffness of the individual filaments and scales with d$^4$, d being the diameter of the filament constituting the cord. Therefore prior art strips are produced from relatively thin filaments typically from 0.15 mm to 0.175 mm.

The inventive roll of strip is made with steel cords of very simple construction comprising a limited number of wires preferably all of the same diameter, that are assembled in preferably one step into a strand. Most preferred is when the steel cord comprises just one single filament, a case explicitly included under the denominator 'steel cord'. A person skilled in the art of steel cord will recognise as suitable cords:

Warrington type of constructions such as 19×1 W. This is a strand assembled in one single operation, hence with one single lay, and with three different filament diameters. It has a metallic density around 84%.

Compact cord types of constructions such as 12 CC. This is a strand that is also assembled in a single operation with one single lay length where all filaments have the same diameter. It has a metallic density of around 70%

Single filaments that have a metallic density of 100%.

The steel used for the steel wires of the invention preferably has a plain carbon steel composition. Such a steel generally comprises a minimum carbon content of 0.40 wt % C or at least 0.70 wt % C but most preferably at least 0.80 wt % C with a maximum of 1.1 wt % C, a manganese content ranging from 0.10 to 0.90 wt % Mn, the sulfur and phosphorous contents are each preferably kept below 0.03 wt %; additional micro-alloying elements such as chromium (up to 0.2 to 0.4 wt %), boron, cobalt, nickel, vanadium—a non-exhaustive enumeration—may also be added. The steel filaments can be coated or not coated. A coating may be applied in order to improve the adhesion to the elastomer. The coating may be an organic coating such as an organo functional silane, organo functional titanate or organo functional zirconate that are known in the art to improve the adhesion. Or the coating may be a metal or metal alloy that is known to adhere to the elastomer such as e.g. brass to rubber. The coating can also be a corrosion protection layer such as a zinc coating or zinc alloy coating such as zinc aluminum.

Indeed the inventive roll of strip discriminates itself from prior art rolls in that the strip is plastically deformed to a certain degree before being wound in a roll. Such a plastic deformation is easily determined by taking a piece of strip—a sample—from a roll with a diameter D. The length of the sample should be approximately equal to 3 to 3.5 times D. When this sample is freely suspended, it will form a coil out of its own. With 'freely suspended' it is meant that all forces acting on the coil, other than the residual stresses of the coil itself are negligible. The diameter $C_1$ of this coil can be measured. According claim 1, this diameter $C_1$ must be smaller than D. Normally one will suspend the coil at its middle and let it hang freely under gravity. However, such a method will be subject to sagging of the coil under the gravitational force. To this end the free hanging ends may be supported in order to counter these gravitational forces.

As an equivalent method for determining the radius of curvature, a sample with a length of only approximately D/5 or smaller can be taken. Such a sample is less vulnerable to the sagging under gravitational force. By measuring the tip rise with respect to a flat layer when the middle of the sample rests on this flat layer, one can determine by standard geometry the radius of curvature of this piece and hence the coil diameter $C_2$ by doubling this radius. Gravitational effects can be further corrected for by repeating the procedure while the sample rests on the flat layer at both ends and the height of the middle part is measured. Through the same type of calculation, one can obtain $C_3$. The average of $C_2$ and $C_3$ is understood to be the most accurate determination of the coil diameter that will be called 'C' from now on, irrespective of the method of measurement.

The inventive roll of strip discriminates itself from the prior art rolls also through the fact that when one detaches the end of the roll, it bends back on the roll when released.

When the roll of strip is to be used for the reinforcement of long, cylindrical like objects like tubes or pillars, the strip can also be preformed so that when it is unwound, it not only displays a radial plastic deformation, but also a lateral displacement (dependent claim 2). The lateral displacement is measured relative to one edge of the strip. Such a lateral displacement must be equal to at least the width of the strip over one complete circumference of the coil.

When using the roll of strip to wrap around a cylindrical object with diameter $D_{object}$, the edges of the strip will just be adjacent to one another when:

$$\frac{1}{(\pi D_{object})^2} + \frac{1}{L^2} = \frac{1}{W^2}$$

where L is the pitch of the strip, i.e. the lateral displacement of strip after just one revolution around the cylinder. It follows immediately that the lateral displacement of the free hanging coil 'K' must at least be equal to the width of the strip. Even more preferred is if this displacement is in line with the final winding angle of the strip on the object to be reinforced, a condition that is achieved when:

$$\frac{D_{object}}{L} = \frac{C}{K}$$

In many cases it is advantageous to wind the strip under a specific angle called the neutral angle on the object to be reinforced. The winding is under the neutral angle when the ratio of the circumference '$\pi D_{object}$' of the strip to the winding pitch length 'L' of the strip equals $\sqrt{2}$=1.41421 . . . . Hence, a roll of strip of which the free hanging coil displays a displacement between 2 to 3 times the coils' diameter is preferred. Even more preferred if the displacement is between 2 and 2.5 times the coil diameter.

The preforming of the strip does not have to extend over the complete length of the strip. It can also be limited to the outer end of the strip (dependent claim 3) to make the connection of the strip to the object to be wrapped easier.

The position of the steel cords is as already mentioned parallel to one another and to the surface. The most convenient way to achieve this is to fix all steel cords in a layer parallel to the surface of the strip. This will yield a strip that can still easily bent in a direction perpendicular to its length and width as the reinforcing steel cords will be found in the neutral plane. Another alternative (as claimed in dependent claim 4) is when the steel cords are distributed over two layers, both parallel to the surface of the strip, but a slightly different distance. Most conveniently the even steel cords are then arranged in the first layer, while the odd steel cords are arranged in the second layer. Such a strip will be much stiffer, because the steel cords are now positioned outside the neutral plane. However this configuration offers a major advantage in the sense that it allows the 'strip filling degree $\phi_{strip}$' to be larger than 1! Hence the strength of the strip can be increased which can reduce the number of reinforcing layers needed.

According a second aspect of the invention a method is provided to produce the inventive roll of strip. In this method the steel cords are held in a single layer before being coated with elastomer. This can be done by unwinding the steel cords from a creel and feeding them through an extruder with a die insert that keeps all steel cords in a single layer before encapsulating them with elastomer. After the extrusion die, the strip is bent over a roller that is preferably cooled. The diameter of the roller is so small that a plastic elongation is given to the steel cord and elastomer composite to the extent that a sample of the strip bends into a coil with a diameter smaller than the diameter of the roll on which it is wound.

The amount of plastic deformation is controlled by the ratio of the diameter of the preforming roller to the thickness of the strip and by the material properties of the composite. The latter is determined by:

- The diameter of the steel wires used in the steel cord and the $\sigma_{0.2}$ yield limit of the wires ($\sigma_{0.2}$ is that stress that has to be applied to a wire in order to have a permanent elongation of 0.2% once the stress has been removed). The thicker the wires used, the easier it is to apply a large elongation on the outermost fibres when bend over the preforming roller. The lower the yield limit is, the easier it will be to give the wires a permanent elongation. The yield limit depends—among other parameters—also on the ultimate tensile strength of the wire: the larger the tensile strength, the more stress is required to permanently deform the wire. Hence steel cords with thick wires having a not too high tensile strength are most preferred in this respect.
- The properties of the elastomer. The elastomer reaches its highest temperature in the extrusion die. At the exit of the extrusion die it is therefore still warm and deformable. By immediate cooling over the preforming roller, the elastomer is 'frozen in' the radius of the preforming roller. The ultimate hardness (shore A, shore D) of the elastomer will thus also determine the degree of plastic deformation.

Given the amount of variables, some experimentation is necessary in order to establish the best roller diameter. First principles calculations indicate that the diameter of the roller must at least be smaller than 20 times the thickness of the strip. Even more preferred is if the diameter of the roller is smaller than 10 times the thickness of the strip.

When the roller is mounted with its axis parallel to the plane of the strip as it leaves the extruder and perpendicular to the longitudinal direction of the strip, it will obtain a residual deformation perpendicular to the width and length dimension of the strip after being pulled over the roller (dependent claim 6). Negligible axial displacement will be observable when sampling the free coil diameter.

When the roller is mounted with its axis parallel to the plane of the strip as it leaves the extruder but mounted under an angle with respect to the length dimension of the strip (different from a right angle) a residual axial displacement will be noticeable on the roll of strip (dependent claim 7).

Another way to obtain a roll of strip with a free coil diameter and an axial displacement is to use the method described above on steel cords that have residual torsions of substantially the same level in the same direction. Residual torsions of a steel cord are torsions that occur when a steel cord end is held fixed while it is being pulled from a spool for about say 6 meters. Upon release of the end, the cord will rotate around its own axis. The number of turns the end makes is 'the number of residual torsions over 6 meters'. When all the cords in the strip exhibit a residual torsion level in the same direction (clockwise or counter clockwise as looking to the spool along the steel cord) and of approximately the same level, this will be reflected in the strip after extrusion. The strip will have the tendency to form a helix when combined with the bending over a roller (dependent claim 8).

A method to produce a roll of strip with the characterising features of claim 4 is claimed in independent claim 9. The steel cords are distributed in a first layer and a second layer, the second layer not coinciding with the first layer. By way of example: the even numbered cords in the strip form the first layer, while the odd numbered cords form the second layer. The method is characterised by the feature that the cords of the second layer are fed at a higher speed than the cords of the first layer. The differential speed leads to a free coil diameter for the roll of strip. As a bonus, the strip is much stiffer as the neutral plane is situated between the two layers. Also the distribution in two layers allows for a strip filling degree $\phi_{strip}$ that is larger than 1.

Another method to produce a roll of strip with the characterising features of claim 4 is claimed in independent claim 10. The distribution of the steel cord in two layers is obtained by attaching two strips to one another. Both strips have the steel cords in a single layer. The two strips are fed at a differential speed so that a residual curvature is built into the roll of strip. Again the strip is stiffer and the strip filling degree $\phi_{strip}$ is larger than 1.

The strips can also be attached to one another with their central cords slightly offset from one another (dependent claim 11). Offsetting is done in the width dimension. In this way an overlap is achieved between subsequent loops. Such an overlap can help to ensure a better closure of the wrapped structure compared to side by side wrapping of strips. Such a closure is beneficial to ensure even support for the structure that has to be reinforced. It can also be helpful when for example additional filler must be cast between the object to be reinforced and the reinforcing structure. The case where concrete has to be poured between the reinforcing strip and a pillar is envisaged.

The attachment of both strips can be done in a number of ways. For example they can be glued to one another. The glue to be used must of course be compatible with the elastomers used. Or—if the elastomer is a thermoplastic elastomer—the strips can be heat welded to one another.

According a third aspect of the invention the use of the roll of strip to reinforce objects of a cylindrical shape is claimed. Using such a roll eliminates the need for preforming a straight strip prior winding it around the object to be reinforced. Such a cylindrical object can be any object that needs to be reinforced. Non-exhaustive examples are:

pipes such as polyethylene pipes although concrete pipes, steel pipes or any other pipe can equally well be reinforced by means of the inventive roll of strip.

cylindrical building structures such as pillars.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
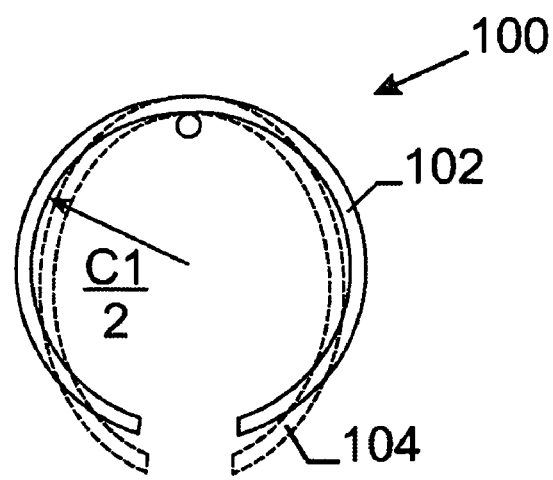
FIG. 1 depicts the measuring method to determine $C_1$.
Figure 2A:
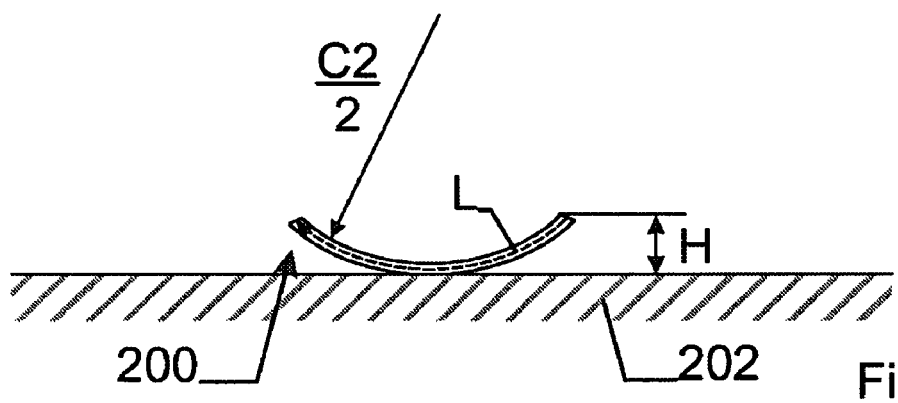
FIGS. 2 'a' and 'b' clarify how $C_2$ and $C_3$ can be measured.
Figure 2B:
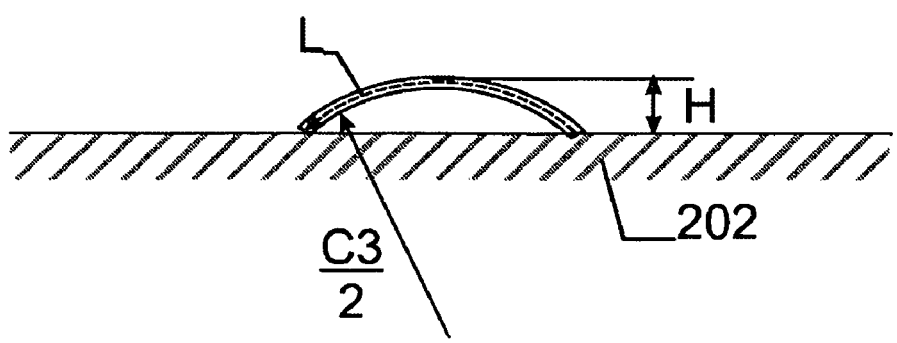
Figure 3:
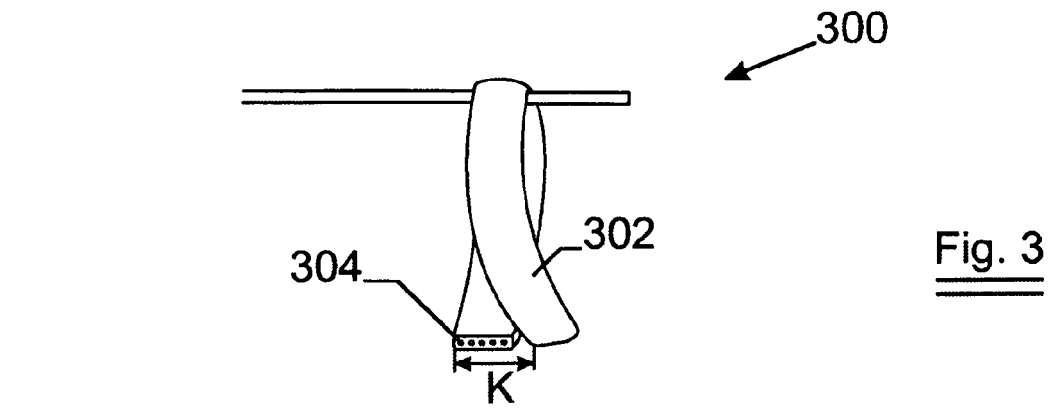
FIG. 3 shows how the axial displacement K is to be determined.

FIGS. 1 to 3 describe the measuring methods to determine the magnitude of the coil diameter. In FIG. 1 a free hanging sample 100 is depicted as cut from the roll of strip. As it slightly sags under its own weight taking the shape 104, the ends have to be supported according 102 in order to establish the 'freely suspended' coil diameter $C_1$.

As this method is somewhat prone to arbitrariness, the method as described in FIG. 2 'a' and 'b' is more preferred. There the radius of curvature of a small piece of strip is determined in two positions: bend upward and bend downward. The length 'L' of the sample is measured, together with the height 'H' the sample makes relative to a flat surface. The relation between H, L and $C_2$ is then simply:

$$\frac{2H}{C_2} = 1 - \cos\left(\frac{L}{C_2}\right)$$

The transcendent equation is readily solved by iteration. As a starting value, $C_2 = L^2/(4H)$ can be used. A correction can be made to take into account the thickness of the sample by subtracting it from 'H'. The same arithmetic applies for both the upward ($C_2$) and downward ($C_3$) pointing sample. The average of the two gives the best approximation of the coiling diameter 'C'. FIG. 3 shows how the axial displacement 'K' is to be determined.

A first sample was made containing 24 steel cords of type 7×3×0.15 that were extruded in HDPE Tub 172 from Solvay. The strip had a width of 45.5 mm. After extrusion, the strip was preformed over a cylindrical tube with a diameter of 120 mm and subsequently heated and cooled. After preforming, the strips kept the cylindrical shape. The higher the heating temperature was, the smaller the coil diameter was:

| Heating temperature | Coil diameter | Axial displacement |
|---|---|---|
| 80° C. | ab. 1200 mm | 3 to 7 mm |
| 100° C. | ab. 1100 mm | 2 to 5 mm |
| 120° C. | 205 mm | 0 to 5 mm |
| 140° C. | 190 mm | 90 to 100 mm |

The coil diameter was estimated from the FIG. 2a configuration.

Figure 4A:
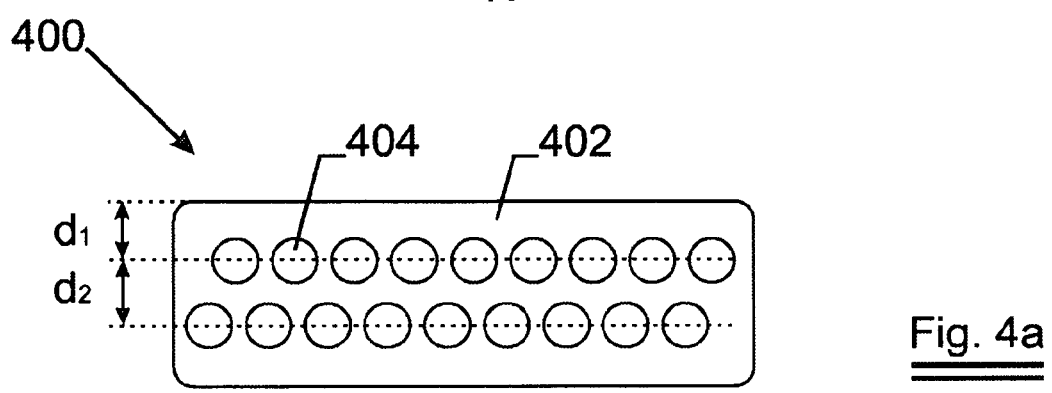
FIGS. 4 'a' and 'b' are cross-sections of a bilayer polymer strip.
Figure 4B:
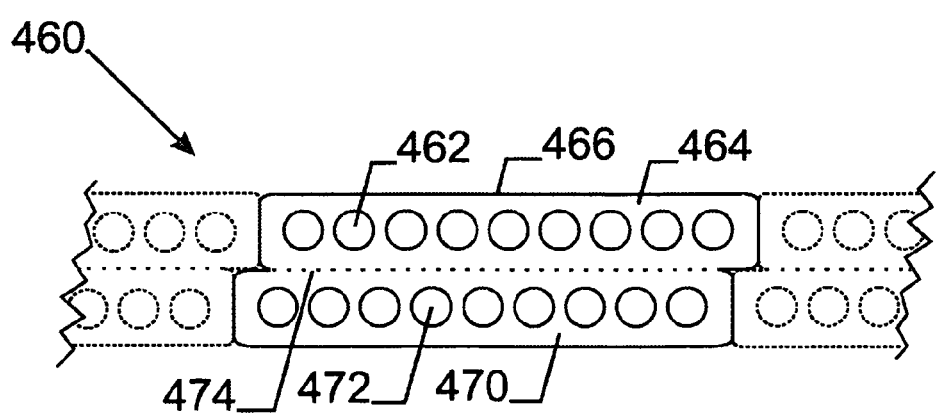

FIG. 4a shows a cross section 400 of a preferred embodiment that comprises two layers of reinforcing steel cords spaced '$d_2$' apart. The strip itself is curved in the direction perpendicular to the width and length dimension (not visible in FIG. 4a). As steel cords 404, 0.365+18×0.34 Compact Cord with high tensile wires are well suited. This cord has a breaking load of 5600 N and has relatively thick filaments of 0.365 and 0.34 mm. The cord itself has a diameter of 1.73 mm. As polymer, HDPE Tub 172 of Solvay can again been used. In one single layer, 45 cords can be accommodated in a total width of 90.25 mm with a core centre spacing of 2 mm. The upper layer (considered to be the layer radial outward from the roll) is a distance '$d_1$' (e.g. about 1 mm) from the surface of the strip. '$d_2$' is by preference slightly larger than the diameter of the cord e.g. 2 mm. This embodiment has the advantage that it allows for a '$\phi_{strip}$' that is larger than 1. Due to the presence of two layers, the strip will be very stiff, but this is in this case not a problem, as due to the given preforming the strip will sling itself around the object to be reinforced. This embodiment can even be further simplified by making it up of two single layer reinforced strips that are glued to one another while being offset width-wise as shown in FIG. 4b. There the assembly 460 is shown that comprises two strips 466 that are heat welded to one another at their common surface 474. The offset allows the different windings to match into one another giving a more closed winding.

Figure 5:
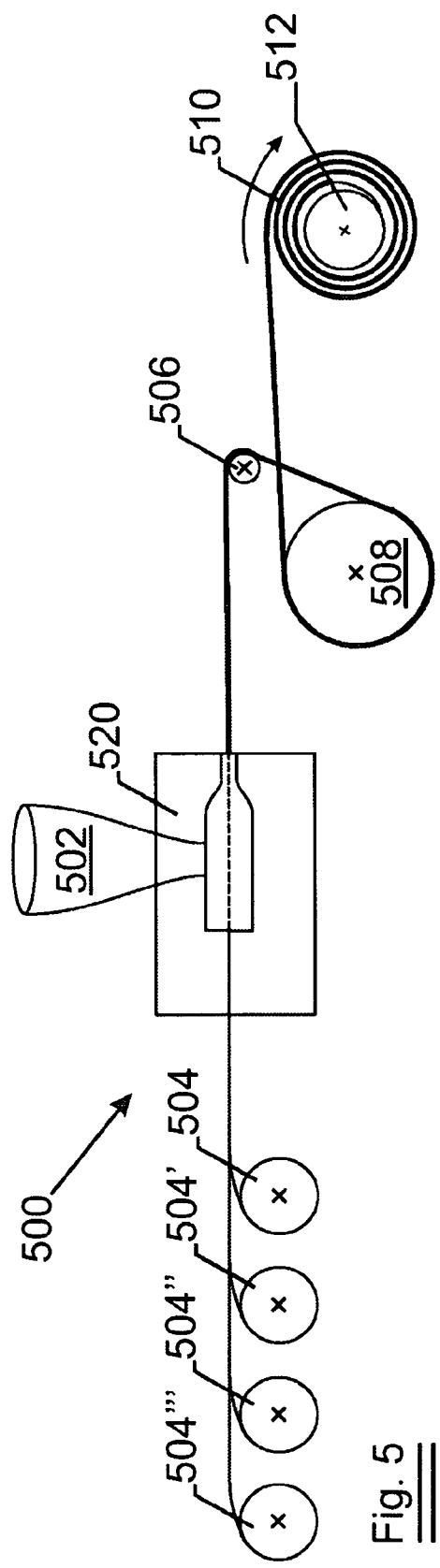
FIG. 5 illustrates the production method for a strip according the invention where the cooling roll is perpendicular to the strip direction.

FIG. 5 illustrates a first method to give the strip a permanent preforming. An extrusion installation 500 is shown, wherein different steel cords are fed from different spools 504, 504', 504", 504''' together with a hopper 502 fed elastomer into an extruder 520. Particular of this extrusion process is the cooled preforming roller 506 that has a small diameter. By preference this diameter is smaller than 20 times the thickness of the tape. Even more preferred is if the diameter of the roller 506 is smaller than 10 times the thickness of the tape. After this the strip is led to the—possibly cooled—pull-through capstan 508. The preforming roller 506 is therefore not necessarily driven. Another particular feature of this extruder is that the strip 510—once extruded—is always bend in the same direction up to the winding onto the roll 512. So care has been taken never to reverse bend the strip.

Figure 6:
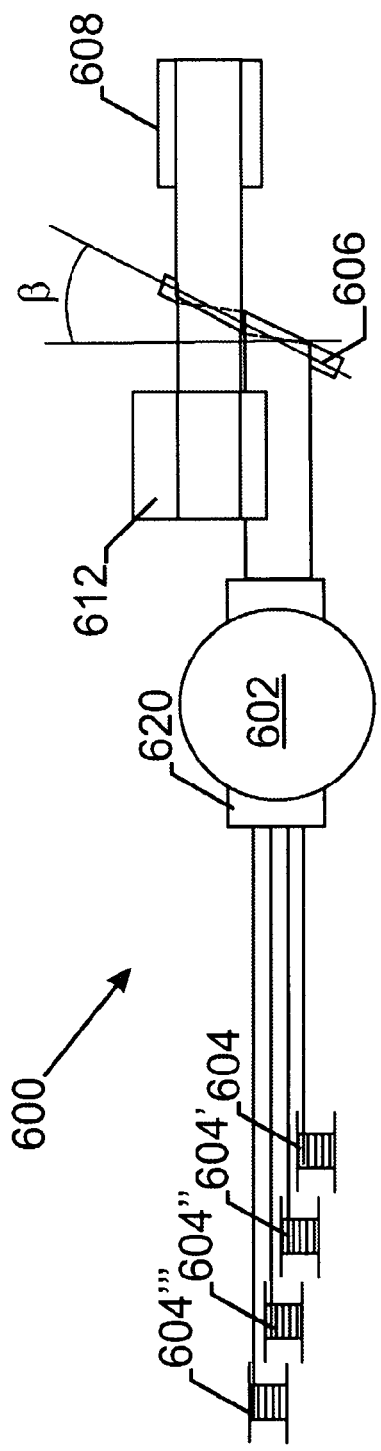
FIG. 6 illustrates the production method for a strip according the invention when the cooling roll is oblique to the strip direction

FIG. 6 illustrates a further improved method to give the strip not only a preformation, but also an offset. Again an extrusion installation 600 is shown with pay-off spools 604, 604', 604", 604''' containing steel cords that are fed into the extruder 620 together with elastomer that is fed through hopper 602. Again the freshly extruded strip is pulled over a cooled preforming roller 606 by the pull-through capstan 608 before being wound onto roll 612. Alike the previous method care has been taken that the strip is only bend into one direction (no reverse bending). The difference with the previous method is that the axis of preforming roller is parallel to plane of extruded cords, but under an angle β with respect to the length dimension of the strip (β is 0 in case the roller axis is perpendicular to the length dimension of the strip). The cosine of β must be larger but close to the ratio of the width of the strip to the lay length of the strip around the roller 606 in order to prevent that the strip would be obstructed by its own winding.

The invention claimed is:

1. A roll of strip comprising:
   an elastomer, and
   steel cords for reinforcing said elastomer, said steel cords being arranged parallel to one another and parallel to a surface of the strip, said roll having a roll diameter,
   wherein a freely suspended sample cut from said roll in a length equal to a circumference of said roll forms a coil having a coil diameter, said coil diameter being smaller than the roll diameter.

2. The roll of strip as in claim 1, wherein a lateral displacement between both ends of said freely suspended sample is larger than or equal to a width of said strip.

3. The roll of strip as in claim 1, wherein said sample is taken at an outer end of the roll.

4. The roll of strip as in claim 1, wherein the steel cords in the strip are alternatingly arranged at a first and a second distance from the surface of said strip.

5. A method to produce a roll of strip comprising the steps of:
   providing steel cords in a substantially parallel arrangement to one another in a single layer,
   forming a strip by encapsulating said parallel arranged steel cords in an elastomer,
   preforming said strip by pulling said strip over a roller, and
   winding said strip into a roll, said roll having a roll diameter,
   wherein a diameter of said roller is smaller than twenty times a thickness of the strip to give the strip a plastic deformation to an extent that a freely suspended sample cut from said roll in a length equal to a circumference of said roll forms a coil, said coil having a coil diameter, the coil diameter being smaller than said roll diameter.

6. The method according to claim 5, wherein an axis of said roller is parallel to said single layer and perpendicular to a length dimension of said strip.

7. The method according to claim 5, wherein an axis of said roller is parallel to said single layer and under an angle to a length dimension of said strip.

8. The method according to claim 5, wherein said steel cords have substantially equal residual torsions in one direction.

9. A method to produce a roll of strip comprising the steps of:
   providing steel cords in a substantially parallel arrangement to one another wherein the steel cords alternatingly are situated in a first layer and a second layer,
   forming a strip by encapsulating said parallel arranged steel cords in an elastomer, and
   winding said strip into a roll,
   wherein said second layer steel cords are fed at a higher speed than said first layer steel cords such that a coil diameter formed by a sample from said roll when said sample is freely suspended, is smaller than a diameter of said roll, said sample being cut from said roll in a length equal to a circumference of said roll.

10. A method to produce a roll of strip with the features of claim 4 comprising the steps of:
    providing a first roll of strip comprising an elastomer and steel cords for reinforcing said elastomer, said steel cords being arranged parallel to one another in a single layer, said layer being parallel to an outer surface of said strip,
    providing a second roll of strip comprising an elastomer and steel cords for reinforcing said elastomer, said steel cords being arranged parallel to one another in a single layer, said layer being parallel to an inner surface of said strip, and
    merging said first and second strip into a composite strip that is subsequently wound into a roll,
    wherein:
    said first and second roll are simultaneously unwound, and
    said outer surface of said first strip is attached to said inner surface of said second strip while said first strip is unwound at a lower linear speed than said second strip thus forming said composite strip.

11. The method according to claim 10, wherein said first and second strip are laterally offset from one another before being attached to one another.

12. The method according to claim 10, wherein said outer and inner surfaces of said first and second strip are glued to one another.

13. The method according to claim 10, wherein said outer and inner surfaces of said first and second strip are welded to one another.

* * * * *